(12) United States Patent
Miyahara et al.

(10) Patent No.: US 7,625,263 B2
(45) Date of Patent: Dec. 1, 2009

(54) OPTICAL DISK RESTORATION APPARATUS

(75) Inventors: Terumasa Miyahara, Minami-Satsuma (JP); Takakazu Miyahara, Minami-Satsuma (JP)

(73) Assignee: Elm Inc., Kaseda (JP)

( * ) Notice: Subject to any disclaimer, the term of this patent is extended or adjusted under 35 U.S.C. 154(b) by 0 days.

(21) Appl. No.: 10/576,368

(22) PCT Filed: Oct. 20, 2003

(86) PCT No.: PCT/JP03/13394

§ 371 (c)(1),
(2), (4) Date: Apr. 19, 2006

(87) PCT Pub. No.: WO2005/038790

PCT Pub. Date: Apr. 28, 2005

(65) Prior Publication Data

US 2007/0072523 A1    Mar. 29, 2007

(51) Int. Cl.
*B24B 21/00*    (2006.01)

(52) U.S. Cl. .................. 451/287; 451/290; 451/291

(58) Field of Classification Search .......... 451/283–290
See application file for complete search history.

(56) References Cited

U.S. PATENT DOCUMENTS

| | | | | |
|---|---|---|---|---|
| 2,615,197 | A * | 10/1952 | Somers | 425/11 |
| 5,102,099 | A * | 4/1992 | Brown et al. | 451/283 |
| 5,938,510 | A * | 8/1999 | Takahashi et al. | 451/290 |
| 5,954,566 | A | 9/1999 | Bauer | |
| 5,954,569 | A * | 9/1999 | Hutchison et al. | 451/63 |
| 6,312,320 | B2 * | 11/2001 | Sato et al. | 451/285 |
| 6,520,895 | B2 * | 2/2003 | Senga et al. | 483/1 |
| 6,595,835 | B2 * | 7/2003 | Gadbois | 451/66 |
| 6,609,959 | B2 * | 8/2003 | Takahashi et al. | 451/65 |
| 6,846,228 | B2 * | 1/2005 | Lin | 451/290 |
| 6,991,524 | B1 | 1/2006 | Cooper et al. | |
| 7,014,543 | B1 * | 3/2006 | Holbrook et al. | 451/66 |
| 2002/0187733 | A1 * | 12/2002 | Lalli et al. | 451/41 |
| 2007/0010167 | A1 * | 1/2007 | Cooper et al. | 451/5 |

FOREIGN PATENT DOCUMENTS

| | | |
|---|---|---|
| DE | 100 04 331 C 1 | 9/2001 |
| JP | U 55-2548 | 1/1980 |
| JP | A 7-130689 | 5/1995 |
| JP | A 8-263881 | 10/1996 |

(Continued)

*Primary Examiner*—Maurina Rachuba
(74) *Attorney, Agent, or Firm*—Oliff & Berridge, PLC

(57) ABSTRACT

The present invention intends to provide an optical disk restoration apparatus that is simple structured and small sized to reduce the production cost, and that can evenly apply a substantially uniform pressing force. This object can be achieved by an optical disk restoration apparatus, including a turntable 41 on which an optical disk 10 is set via a non-slip sheet 45, a polishing body holder 47 for holding a polishing body 46, a pressing mechanism for pressing the polishing body 46 and the optical disk 10 onto each other with a predetermined pressure required for the polishing process, and a motor 48 for rotating at least the polishing holder 47 and the polishing body 46 to polish the surface of the optical disk 10, where the surface of the turntable 41 and/or the sheet 45 is provided with at least one of an inclined, step-like or curved profile.

10 Claims, 12 Drawing Sheets

FOREIGN PATENT DOCUMENTS

| | | |
|---|---|---|
| JP | A 10-113859 | 5/1998 |
| JP | A-2000-011601 | 1/2000 |
| JP | U 3073999 | 9/2000 |
| JP | A 2001-291362 | 10/2001 |
| JP | A 2002-086338 | 3/2002 |
| JP | A 2002-190180 | 7/2002 |
| WO | WO 02/05280 A2 | 1/2002 |

* cited by examiner (A)

(B)

(A)

(B)

(C)

(D)

(E)

(F)

(A)

(B)

(A)

(B)

(A)

(B)

(C)

(A)

(B)

(A)

(B)

(A)

(B)

(A)

(B)

ic disk 10 is a CD, the information is recorded on the side
OPTICAL DISK RESTORATION APPARATUS

TECHNICAL FIELD

The present invention relates to an apparatus for grinding or polishing the surface of an optical disk, such as a compact disk (CD) or digital versatile disk (DVD), from which the information recorded in the disk is read out.

BACKGROUND ART

In recent years, there have been many types of optical disks distributed. FIG. 1 shows an example of such optical disks. The optical disk 10 shown in FIG. 1 is made of a resin that is transparent to the wavelength of the readout beam. Its typical diameter is 120 mm and the thickness is 1.2 mm. If the optical disk 10 is a CD, the information is recorded on the side opposite to the transparent surface (i.e. the readout surface) from which the information is to be read out. If it is a DVD, the information is recorded on a layer located at a depth of about 0.6 mm from the readout surface.

The recorded information can be read out by casting a laser beam through the readout surface onto the information layer and detecting the beam reflected by the information layer. Therefore, if a scratch is present on the readout surface, the information cannot be correctly read out because the readout beam is scattered or blocked by the scratch.

Presence of a scratch on the readout surface does not damage the information itself because the actual information is not recorded on the readout surface. Accordingly, removal of the scratch by polishing the readout surface has been carried out to restore the optical disk 10 so that the information can be read out again.

The planer area on which the recorded information is located extends from 22 to 58 mm in the radial distance from the center of the optical disk 10. Therefore, in the process of polishing the readout surface, it is particularly necessary to evenly and smoothly polish this area of the readout surface (i.e. the shaded area 10A in FIG. 1(A). This shaded area 10A is called the polishing area hereinafter).

An example of conventional optical disk restoration devices is shown in FIG. 2, which is a side view schematically showing the construction of the conventional optical disk restoration apparatus.

The optical disk restoration apparatus shown in FIG. 2 includes a disk rotating controller for rotating the optical disk 10 and a polishing body rotator for holding and rotating the polishing body.

The disk rotating controller includes: a turntable 22 having a shaft 21 as the rotation shaft, on which the optical disk 10 is to be set; a bearing 23 providing a rotatable support of the shaft 21; and a rotating controller 28 for regulating the rotation of the turntable 22.

The polishing body rotator, which is located over the disk rotating controller, includes a polishing body holder 26 for holding the polishing body 25 via an attaching/detaching means 24, a motor 27 for rotating the polishing body 25, and a pressing mechanism (not shown) for pressing the polishing body 25 onto the optical disk 10 with a predetermined pressure required for polishing.

In the conventional optical disk restoration apparatus having the above-described construction, the optical disk 10 is rotated around the shaft 21 in one direction, and the polishing body 25 being pressed onto the optical disk 10 is rotated in the same or opposite direction. Meanwhile, the rotating controller 28 regulates the rotation of the optical disk 10 so that a speed difference or speed ratio appropriate for the polishing process takes place between the two elements 10 and 25. This causes friction between the optical disk 10 and the polishing body 25, so that the (readout) surface of the optical disk 10 is polished by the polishing body 25.

In this optical disk restoration apparatus, the center of the polishing body 25 is located in proximity to the outer circumference of the optical disk 10 (in the present case, it is located inside the circumference, which can be outside the circumference) in order to polish the polishing area 10A. Therefore, the polishing body 25 operated by the pressing mechanism is mainly pressed onto the area close to the outer circumference of the optical disk 10.

However, when the pressing, i.e. the pressure is centered in proximity to the outer circumference of the optical disk 10, the pressing force is unevenly distributed within the polishing area 10A. This may be due to the rigidity of the turntable 22 or polishing body holder 26, which is high at the center but lower at the points closer to the circumference, or due to some structural looseness present per se in the disk rotating controller or the polishing body rotator. This results in a situation where a high level of pressure acts on the outer area of the optical disk 10 whereas its inner area receives only the lowest level of pressure. If this occurs, the area receiving the high pressure is excessively polished, whereas the area receiving the lowest pressure is inadequately polished.

To produce a substantially uniform distribution of the pressing force within the polishing area 10A, an apparatus shown in FIG. 3 has been proposed. In the optical disk restoration apparatus shown in FIG. 3, the polishing body rotator 31 and/or the disk rotating controller 32 is inclined inwards (i.e. toward the center of the apparatus) by a predetermined angle to decrease/increase the pressing force working on the outer/inner area of the optical disk 10.

However, the above-described construction, in which the polishing body rotator 31 and/or the disk rotating controller 32 is to be inclined, requires a mechanism for inclining the aforementioned mechanism 31 or 32 and also a regulating mechanism for adjusting the inclination to a predetermined angle. As a result, the apparatus becomes more complex, which is accordingly larger and more expensive.

In the above-described optical disk restoration devices shown in FIGS. 2 and 3, the polishing process is performed with a single polishing body. On the other hand, it has already been a general practice to use multiple types of polishing bodies differing in fineness and/or softness, particularly in order to effectively remove deep scratches. One example is the mirror polishing technique, in which a rough polishing process using a sandpaper-like polishing body is performed, which is followed by another polishing process using a polishing liquid ("compound") and a polishing body made of cloth or sponge ("buff").

FIG. 7 shows an example of conventional optical disk restoration devices using multiple polishing bodies. FIG. 7 is a plan view of the conventional optical disk restoration apparatus (A) and a side view (B).

The optical disk restoration apparatus shown in FIG. 7 mainly consists of a disk rotating controller 70 for rotating the optical disk 10 and a polishing body rotator 71 for holding and rotating the polishing bodies.

The disk rotating controller 70 includes a turntable 702 having a shaft 701 as the rotation shaft, a bearing 703 providing a rotatable support of the shaft 701, and a rotating controller 704.

The polishing body rotator 71, which is located over the disk rotating controller 70, includes a turret 712 for holding multiple (four in the present apparatus) polishing bodies 711, a turret driver (not shown) for rotating the turret 712, and a motor 713 for rotating the polishing body 711. In the turret 712, the polishing body 711 is fixed to a rotatable shaft 714 supported by a bearing (not shown). The shaft 714 is provided with driven gears 716, which is to be engaged with a drive gear 715 linked to the motor 713. The driving force of the motor 713 is transmitted through these gears 715 and 716 to the shaft 714 of the polishing body 711.

The polishing body rotator 71 and/or the disk rotating controller 70 includes an elevator (not shown) for vertically moving the polishing body 711 and/or the optical disk 10 so that the polishing body 711 and the optical disk 10 are pressed onto each other or separated from each other.

The conventional optical disk restoration apparatus having the above construction operates as follows:

First, the operator mounts an optical disk 10 on the turntable 702. At this moment, the mounted optical disk 10 and the polishing body 711 are out of contact with each other.

After the optical disk 10 is mounted, the turret driver rotates the turret 712 so that one of the driven gears 716 is engaged with the drive gear 715. Which of the four driven gears 716 is to be engaged with the drive gear 715 is determined depending on the depth of the scratch on the surface of the optical disk 10. For a deep scratch, the driven gear 716 fixed to the shaft 714 of a coarse polishing body 711 is brought into engagement with the drive gear 715. For a shallow scratch, on the other hand, the driven gear 716 fixed to the shaft 714 of a fine polishing body 711 is brought into engagement with the drive gear 715.

After one of the driven gears 716 is engaged with the drive gear 715, the elevator of the polishing body rotator 71 and/or the disk rotating controller 71 produces a vertical force to press the polishing body 711 and the optical disk 10 onto each other.

After the pressing operation, the motor 713 is activated to rotate the polishing body 711. Alternatively, it is possible to start the rotation of the polishing body 711 before the pressing operation is started. Meanwhile, the rotating controller 704 is also activated to rotate the optical disk 10. It is also possible to make the optical disk 10 passively rotate due to the reaction force resulting from the rotation of the polishing body 711. In this case, the rotating controller 704 regulates the rotation of the optical disk 10 so that a speed difference or speed ratio appropriate for the polishing process takes place between the two elements 10 and 711.

Thus, friction is caused between the optical disk 10 and the polishing body 711, whereby the surface of the optical disk 10 is polished by the polishing body 711.

After the above polishing process is finished, the elevator produces a vertical force to separate the polishing body 711 and the optical disk 10 from each other, and the rotation of the motor 713 and the rotating controller 704 is stopped.

Subsequently, the driven gear 716 (i.e. the polishing body 711) to be engaged with the drive gear 715 is switched to a new one, and the above-described sequential operations are performed again. If the previously used polishing body is the coarse type 711a, a fine polishing body 711b should be hereby used. If the previously used polishing body is the fine type 711b (including the case where the fine polishing body 711b is used after the coarse type 711a), a finer polishing body 711c for the finish polishing should be hereby used. After the polishing body 711c is used for the finish polishing, a polishing liquid (compound) and a polishing body (buff) 711d for mirror polishing should be used. After the mirror polishing process is performed as described earlier, the optical disk restoration process using the present apparatus is totally finished.

In the conventional optical disk restoration apparatus constructed and operated as described above, when the elevator is activated to press the polishing body 711 and the optical disk 10 onto each other, all of the four polishing bodies 711 held by the turret 712 come closer to the optical disk 10. Therefore, as shown in FIG. 7, it is necessary to position the center (or rotation shaft) of the turret 712 outside the circumference of the optical disk 10 so that only a proper polishing body 711 is pressed onto the optical disk 10 in each stage of the above-described restoration process. However, such a positioning of the turret 712 relative to the optical disk 10 makes the restoration apparatus larger and accordingly increases the production cost.

To solve the above problem, the present invention intends to provide an optical disk restoration apparatus that is simple structured and small sized to reduce the production cost, that can evenly apply the pressing force, and that is capable of performing a polishing process in which only a proper polishing body is selected from multiple polishing bodies and pressed onto the optical disk in each stage of the optical disk restoration process.

DISCLOSURE OF THE INVENTION

To solve the above-described problem, the optical disk restoration apparatus according to the first aspect of the present invention is characterized in that it includes:

a) a rotatable object holder for holding an object to be polished;

b) a rotatable polishing body-holding unit for holding a polishing body;

c) a pressing means for pressing the object holder and the polishing body-holding unit onto each other with a predetermined pressure required for the polishing process; and d) a driver for rotating at least the polishing body-holding unit, where the holding surface of the object holder is provided with at least one of an inclined, step-like or curved profile.

In the optical disk restoration apparatus according to the first aspect of the present invention, the object (e.g. an optical disk) held by the object holder and the polishing body held by the polishing body-holding unit are pressed onto each other by the pressing means with a predetermined pressure. This pressure (or pressing force) is at the level required for polishing the surface of the object, which is largely within the range from 5 to 100 kPa in the case of polishing an ordinary type of optical disk, such as a CD or DVD. The pressing means may be constructed so that either the object holder or the polishing body-holding unit is fixed and the other is pressed onto the fixed one, or both components may be activated and pressed onto each other.

In the operation of pressing the object and the polishing body onto each other, the distribution of the pressing force is substantially even due to the holding surface of the object holder (i.e. the side on which the object is to be held), which is provided with at least one of an inclined, step-like or curved profile. For example, if the holding surface is provided with a downward inclination (i.e. the "downward" hereby means that the surface is inclined from the center down to the circumference of the object), the pressing force increases in proximity to the center of the object whereas it decreases in proximity to the circumference of the object. Therefore, even if the rigidity of the object holder and/or the polishing body-holding unit at the center differs from that at the circumference, or even if the object holder and/or the polishing body-holding unit has some structural looseness, it is possible to make the distribution of the pressing force substantially uniform over the surface of the object by properly regulating the angle of the inclination. Furthermore, the present apparatus does not need any additional mechanism for adjusting the inclination to a predetermined angle or for providing an inclination itself. Therefore, the apparatus can be simple structured and accordingly small sized to reduce the production cost.

To solve the above-described problem, the optical disk restoration apparatus according to the second aspect of the present invention is characterized in that it includes:

a) a rotatable object holder for holding an object to be polished;

b) a first polishing body-holding unit for holding multiple polishing bodies;

c) a second polishing body-holding unit for holding one of the polishing bodies while allowing its rotation;

d) a pressing/separating means for pressing or separating the object to be polished and the polishing body held by the second polishing body-holding unit onto or from each other; and e) a driver for rotating at least the second polishing body-holding unit.

In the optical disk restoration apparatus according to the second aspect of the present invention, the second polishing body-holding unit holds one of the multiple polishing bodies held by the first polishing body-holding unit (e.g. a coarse polishing body or a buff) for each stage of the optical disk restoration process. Then, the pressing/separating means presses the polishing body held by the second polishing body-holding unit and the object onto each other. Subsequently, the driver activates the second polishing body-holding unit to rotate the polishing body. Meanwhile, the driver also activates the object holder to rotate the object. It is also possible to make the object passively rotate due to the reaction force resulting from the active rotation of the polishing body. In this process, a rotating controller may be preferably used to regulate the rotation of the object so that a predetermined speed difference or speed ratio appropriate for the polishing process takes place between the object and the polishing body. Rotating both the polishing body and the object causes friction between them and makes the surface of the object polished by the polishing body. After the polishing process is finished, the pressing/separating means separates the object and the polishing body from each other. The polishing body thus separated from the object is returned to the first polishing body-holding unit so as to be hold again. "Switching from one polishing body to another can be achieved by rotating the first polishing body-holding unit to a position where the second polishing body-holding unit faces to the desired type of polishing body. Then, after setting a new polishing body to the second polishing body-holding unit, the apparatus performs the above-described sequential operations. After the operation is sequentially performed as for each desired polishing body, the work operation is terminated."Alternatively, instead of rotating the first polishing body-holding unit, it is possible to operate the second polishing body-holding unit to turn (or revolve) around the first polishing body-holding unit, which is fixed. This construction requires the axis of the first polishing body-holding unit to substantially coincide with the revolving axis of the second polishing body-holding unit and also the aforementioned two axes to substantially coincide with the axis of the object holder so that the polishing body held by the second polishing body-holding unit can come to the position where it can polish the object.

In the optical disk restoration apparatus according to the present invention, only one of the multiple polishing bodies held by the first polishing body-holding unit can be pressed onto the object to be polished. Even if the rotation axis of the first polishing body-holding unit substantially coincides with that of the object holder, the multiple polishing bodies held by the first polishing body-holding unit are not simultaneously pressed onto the object to be polished. Thus, the polishing process is performed with only a proper polishing body being pressed onto the object in each stage of the restoration process, and this construction allows the apparatus to be smaller and accordingly less expensive.

BEST MODES FOR CARRYING OUT THE INVENTION

Figure 1:
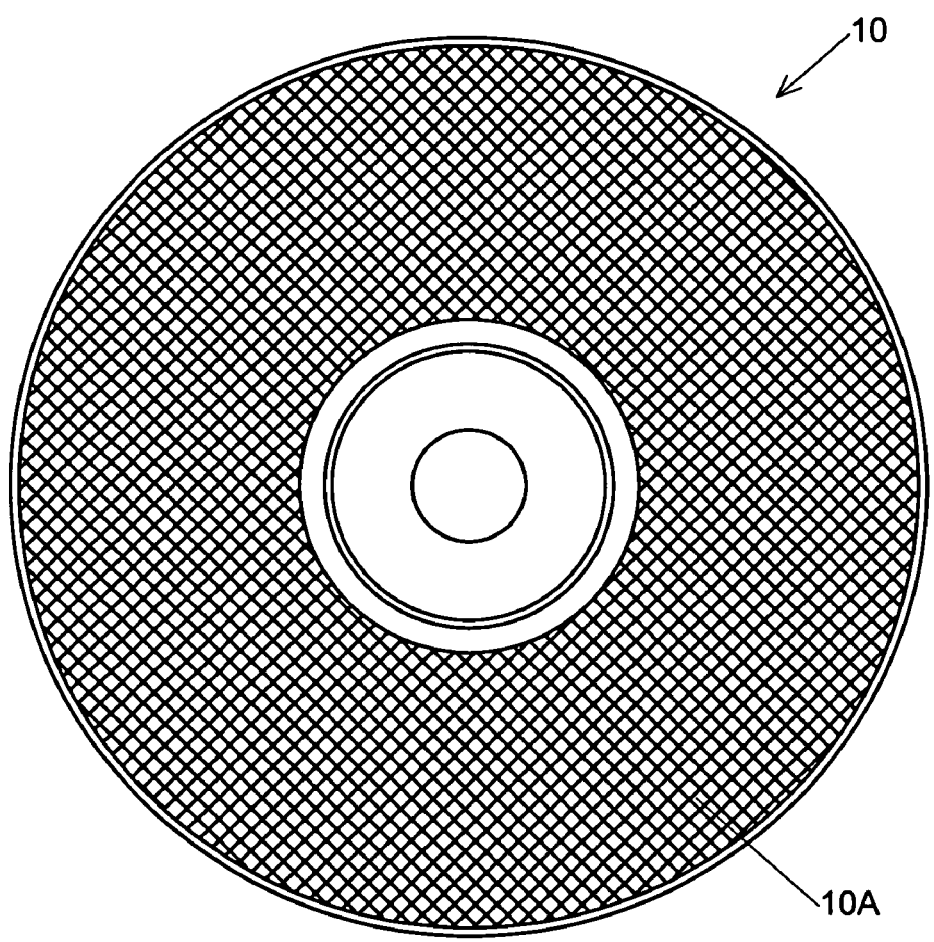
FIG. 1 is a plan view (A) and a sectional view (B) of an optical disk.
Figure 1:
Figure 2:
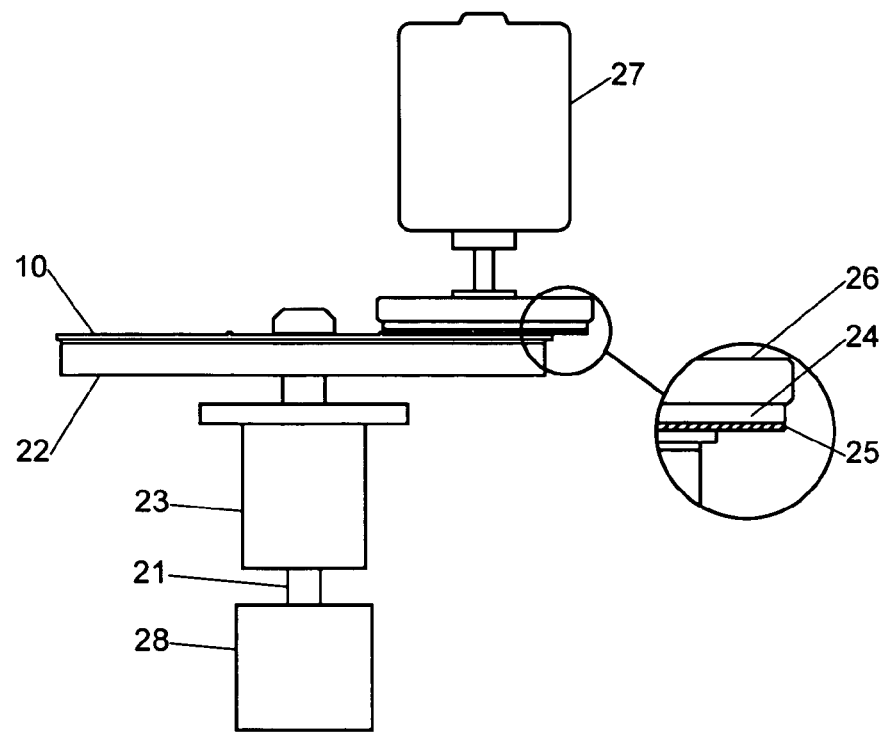
FIG. 2 is a side view schematically showing the construction of a conventional optical disk restoration apparatus.
Figure 3:
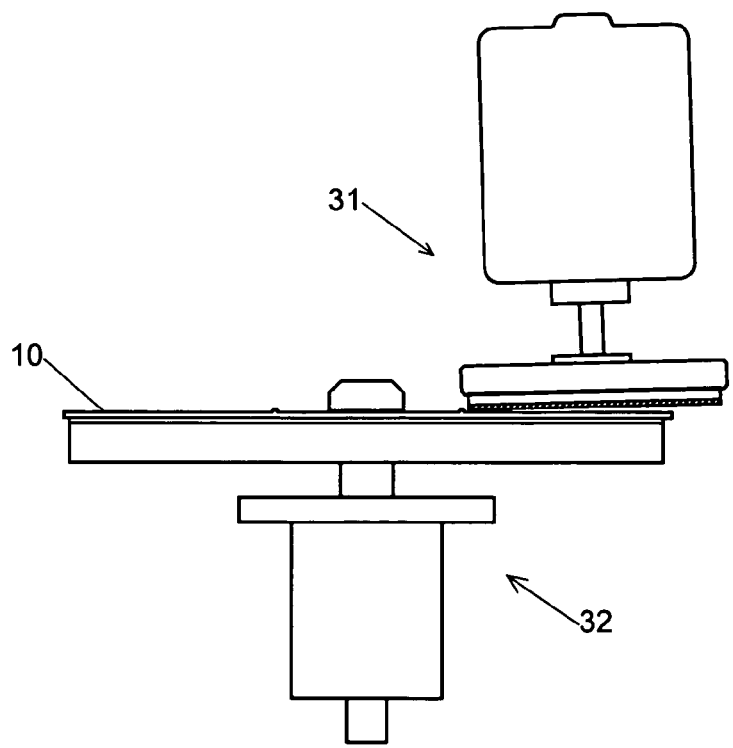
FIG. 3 is a side view schematically showing the construction of a modified version of the conventional optical disk restoration apparatus shown in FIG. 2.
Figure 4:
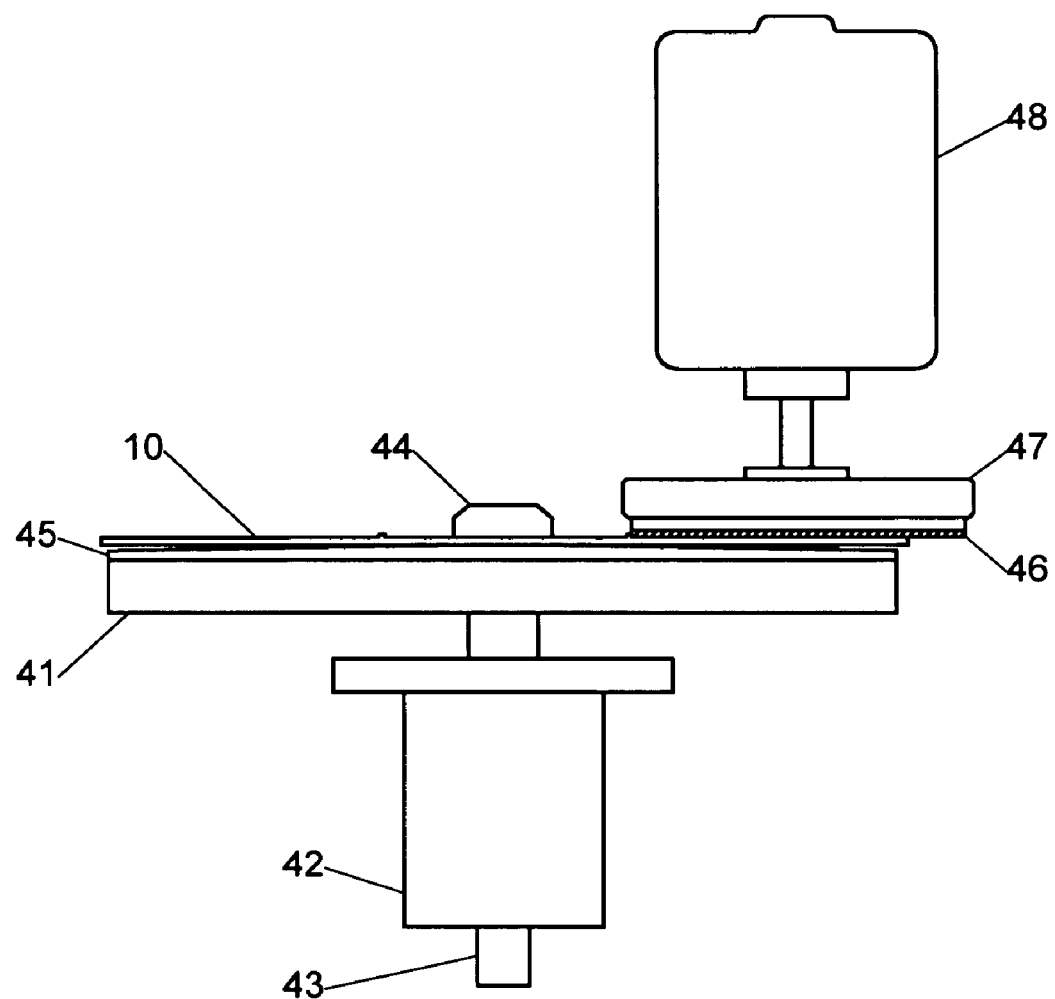
FIG. 4 is a side view schematically showing the construction of an optical disk restoration apparatus according to the first embodiment of the present invention.

First, the first embodiment of the optical disk restoration apparatus according to the present invention is shown in FIG. 4, which is a side view schematically showing the construction of the optical disk restoration apparatus of the first embodiment.

The optical disk restoration apparatus of the present embodiment includes a disk rotating controller for rotating an optical disk and a polishing body rotator for holding and rotating the polishing body.

In the disk rotating controller, a turntable 41 is fixed to the upper end of a rotatable shaft 43 supported by a bearing 42. The turntable 41 has a center pin 44 located at its center, which is used to position the optical disk 10 at the center of the turntable 41. Inserted between the optical disk 10 and the turntable 41 is a sheet 45, which prevents the optical disk 10 from slipping on the turntable 41 and protects the surface of the optical disk 10 from additional scratches, which may result from dust, similar fine matters or the hard-finished turntable 41.

The polishing body rotator, which is located over the disk rotating controller, includes a polishing body holder 47 for holding a polishing body 46, a motor 48 for rotating the polishing body holder 47, and a pressing mechanism (not shown) for pressing the polishing body 46 onto the optical disk 10 with a predetermined pressure required for the polishing process.

Figure 5:
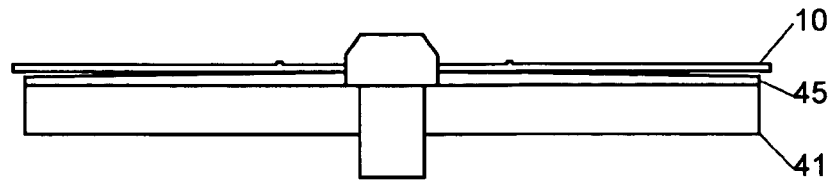
FIG. 5 is a sectional views schematically showing various constructions of the main section of the optical disk restoration apparatus of the first embodiment ((A) to (F)).
Figure 5:
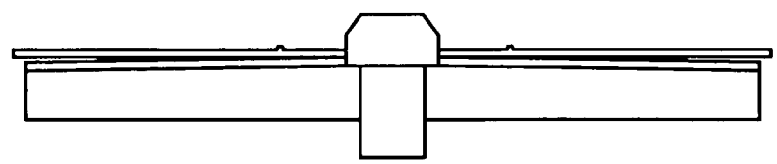
Figure 5:
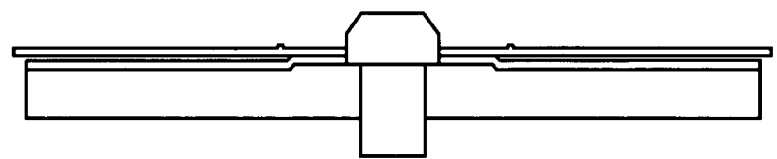
Figure 5:
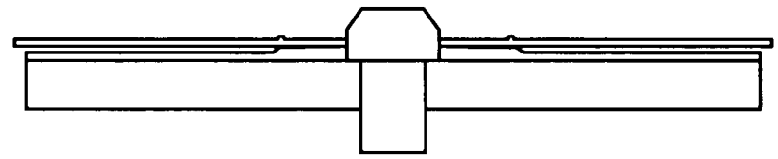
Figure 5:
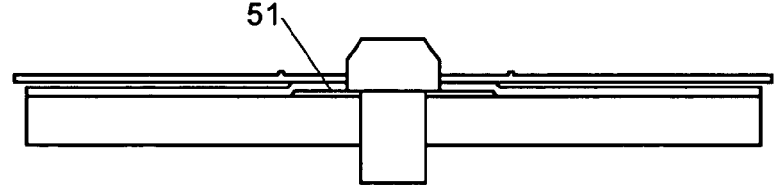
Figure 5:
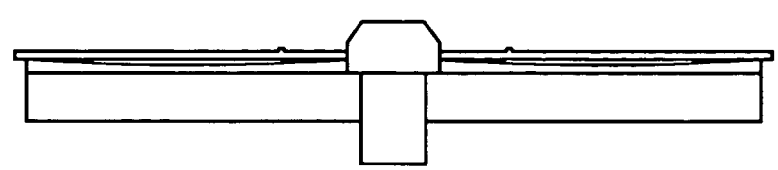

Enlarged views of the turntable 41 and other components surrounding it in the disk rotating controller are shown in FIG. 5, where (A) to (F) are sectional views schematically showing various constructions of the turntable 41 and the surrounding components.

In FIG. 5(A), the thickness of the turntable 41 is uniform, whereas the thickness of the sheet 45 is gradually decreased from the center to the circumference of the optical disk 10. Thus, the surface for holding the optical disk 10 (i.e. the surface of the sheet 45) is inclined downwards.

In FIG. 5(B), the thickness of the sheet 45 is uniform, whereas the thickness of the turntable 41 is gradually decreased from the center to the circumference of the optical disk 10. Thus, the surface for holding the optical disk 10 is inclined downwards.

In FIG. 5(C), the thickness of the sheet 45 is uniform, whereas the thickness of the turntable 41 is changed (more specifically, decreased) between two levels from the center to the circumference of the optical disk 10. Thus, the surface for holding the optical disk 10 has a downward, step-like profile. Of course, the number of thickness levels, which is two in FIG. 5(C), can be more than two.

In FIG. 5(D), the thickness of the turntable 41 is uniform, whereas the thickness of the sheet 45 is changed (or decreased) between two levels from the center to the circumference of the optical disk 10. Thus, the holding surface for the optical disk 10 has a downward, step-like profile. It should be noted that the number of thickness levels, which is two in FIG. 5(D), can be more than two, as in the case of FIG. 5(C).

In FIG. 5(E), each of the turntable 41 and the sheet 45 has a uniform thickness, and a spacer 51 is inserted between the two elements 41 and 45 in proximity to the center of the optical disk 10. Thus, the surface for holding the optical disk 10 has a downward, step-like profile. Examples of the spacer 51 include a ring-shaped thin plate made of resin or metal, a stack of double-sided tapes, and so on.

In FIG. 5(F), the thickness of the turntable 41 is uniform, whereas the thickness of the sheet 45 is varied so that the surface is curved downwards. Thus, the surface for holding the optical disk 10 has a downward-curved profile. In some cases, the intermediate area of the optical disk 10 between the circumference and the center may be excessively polished depending on the speed ratio between the optical disk 10 and the polishing body 46, the type of the polishing body 46, the polishing method or other factors. In such cases, the construction shown in FIG. 5(F) is recommendable.

In addition to the constructions shown in FIG. 5(A)-(F), there are many different constructions to provide the surface for holding the optical disk 10 with an inclination or other profiles.

Figure 6:
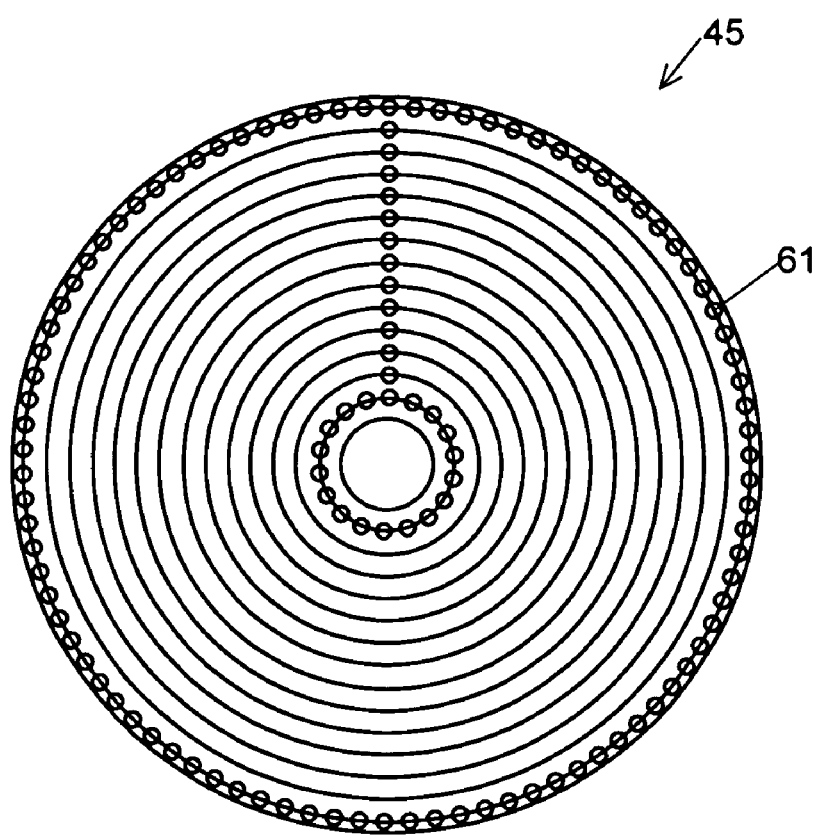
FIG. 6 shows an example of a sheet used in the optical disk restoration apparatus of the first embodiment, where (A) is a plan view and (B) is a sectional view.
Figure 6:
Figure 7:
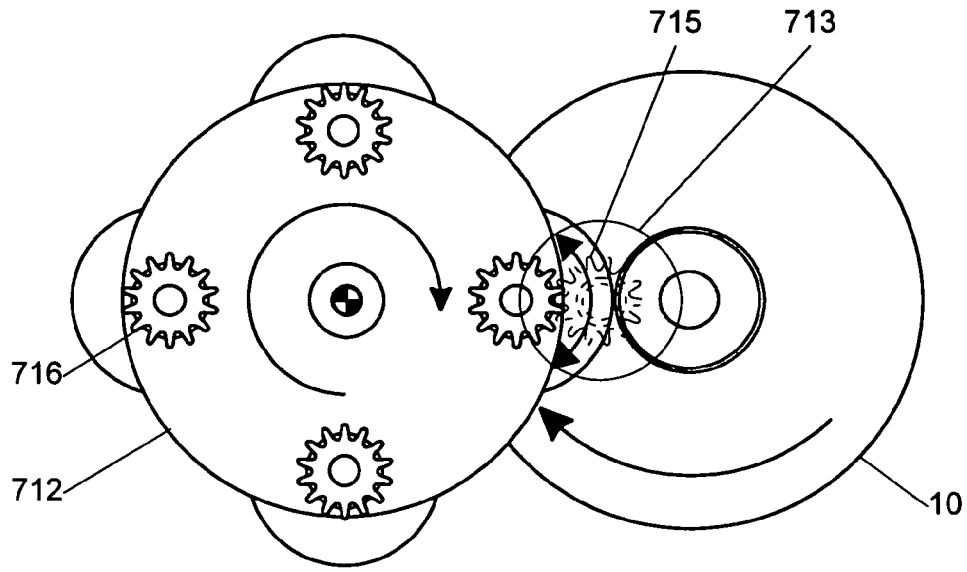
FIG. 7 is a plan view (A) and a side view (B) schematically showing the construction of another conventional optical disk restoration apparatus.
Figure 7:
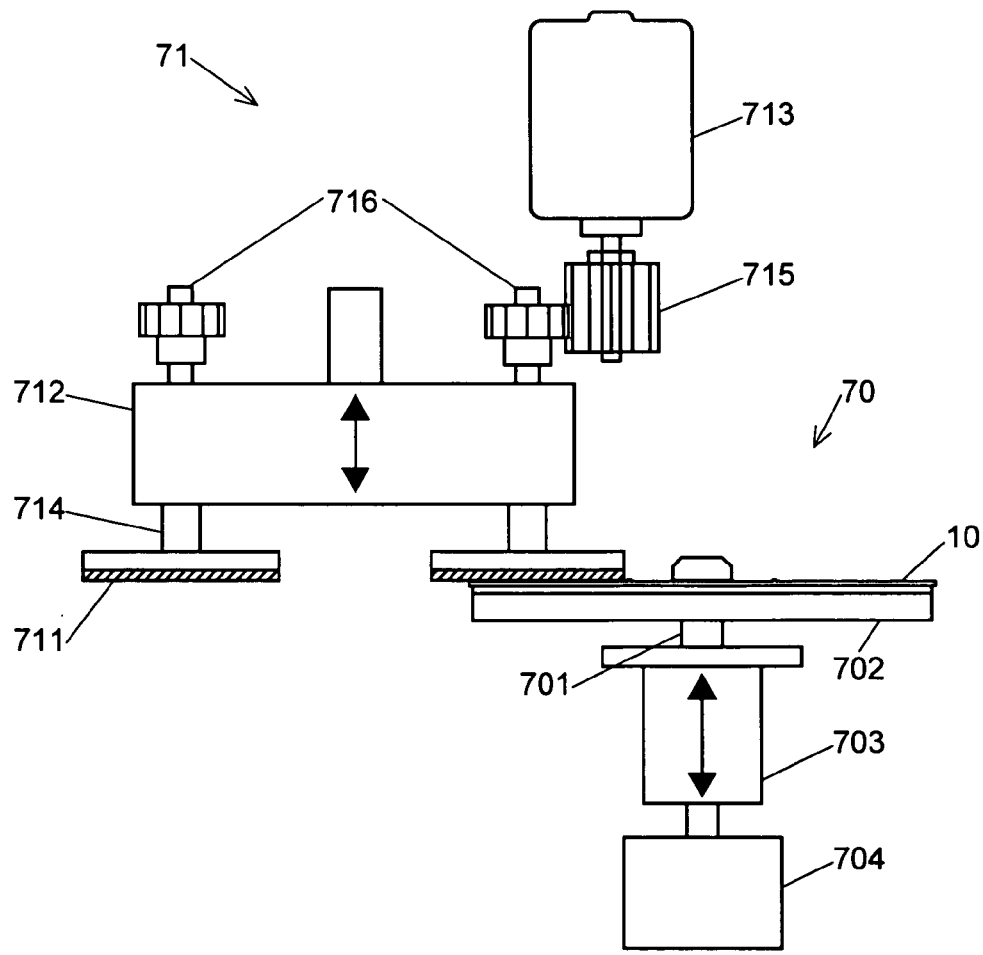

The sheet 45 shown in FIG. 6 has a large number of projections 61 on its surface, which prevent the optical disk 10 from slipping on the sheet 45 during the polishing operation. In this case, the hardness of the projections 61 or the density with which the projections 61 are spread or their cross-sectional area can be appropriately varied to provide the surface for holding the optical disk 10 with an inclination or other profiles.

It is also possible, for example, to vary the hardness of the sheet 45 between the center and the circumference of the optical disk 10 to provide the surface holding for the optical disk 10 with an inclination or other profiles.

Furthermore, it is possible to appropriately combine two or more of the inclined, step-like and curved profiles and provide the surface for holding the optical disk 10 with the combination of the profiles (e.g. an inclined, step-like profile).

Figure 8:
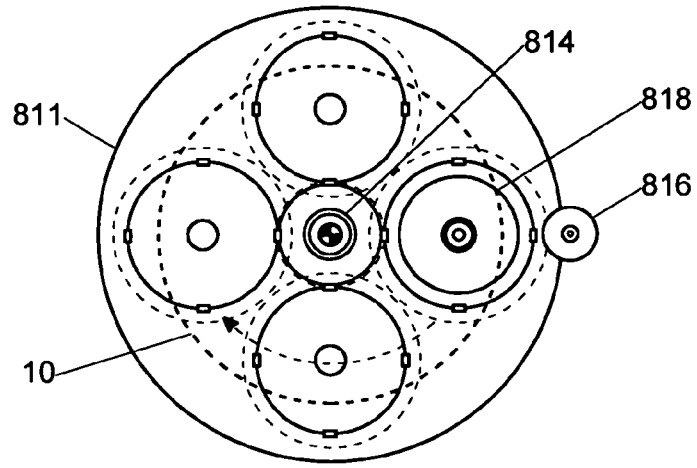
FIG. 8 schematically shows the construction of an optical disk restoration apparatus according to the second embodiment of the present invention, where (A) is a plan view and (B) and (C) are side views.
Figure 8:
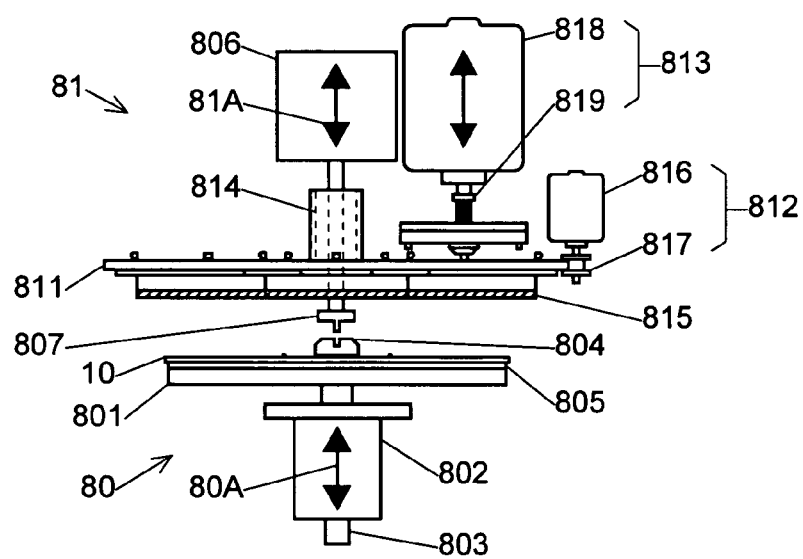
Figure 8:
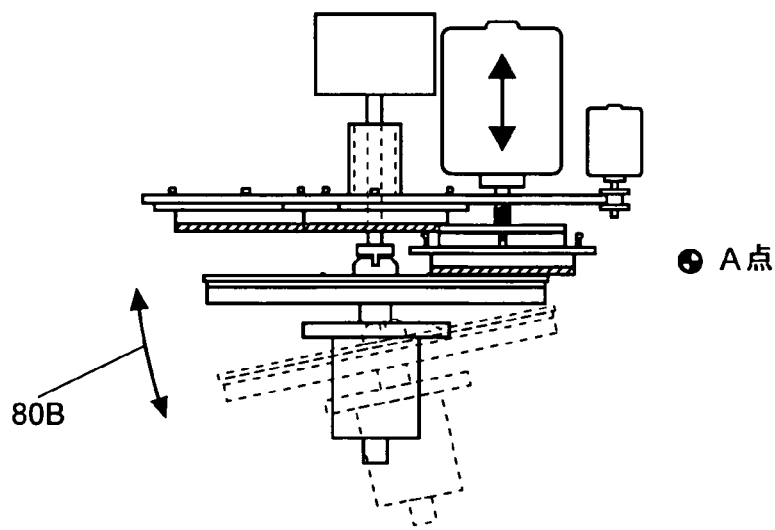

FIG. 8 shows the second embodiment of the optical disk restoration apparatus according to the present invention. FIG. 8(A) is a plan view, and FIGS. 8(B) and (C) are side views.

The optical disk restoration apparatus of the present embodiment mainly consists of a disk rotating controller 80 for rotating an optical disk and a polishing mechanism 81 for polishing the optical disk. The polishing mechanism 81 is located over the disk rotating controller 80 in the present case but may be differently positioned. For example, it is possible to turn the entirety of the polishing mechanism 81 by 90 degrees so that it is positioned next to the disk rotating controller 80.

In the disk rotating controller 80, a turntable 801 is fixed to the upper end of a rotatable shaft 803 supported by a bearing 802. A center pin 804 is fixed to the center of the turntable 801. A sheet 805 is inserted between the optical disk 10 and the turntable 801.

Figure 13:
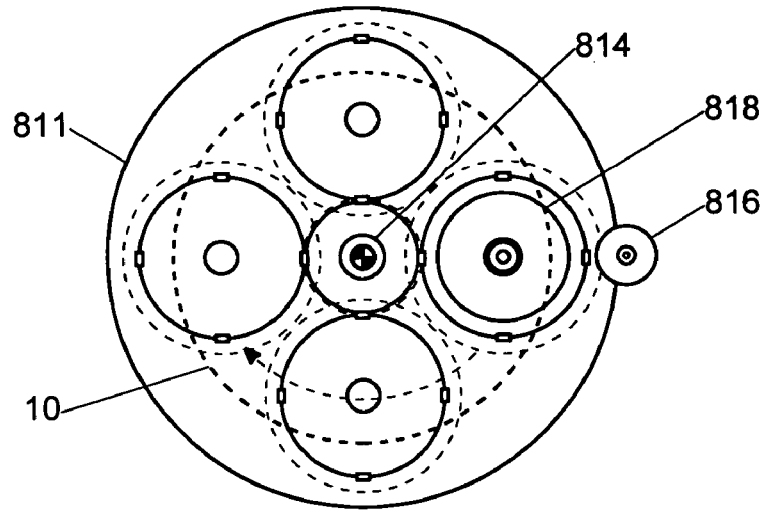
FIG. 13 is a plan view (A) and a side view (B) schematically showing the construction of a modified version of the optical disk restoration apparatus according to the second embodiment.
Figure 13:
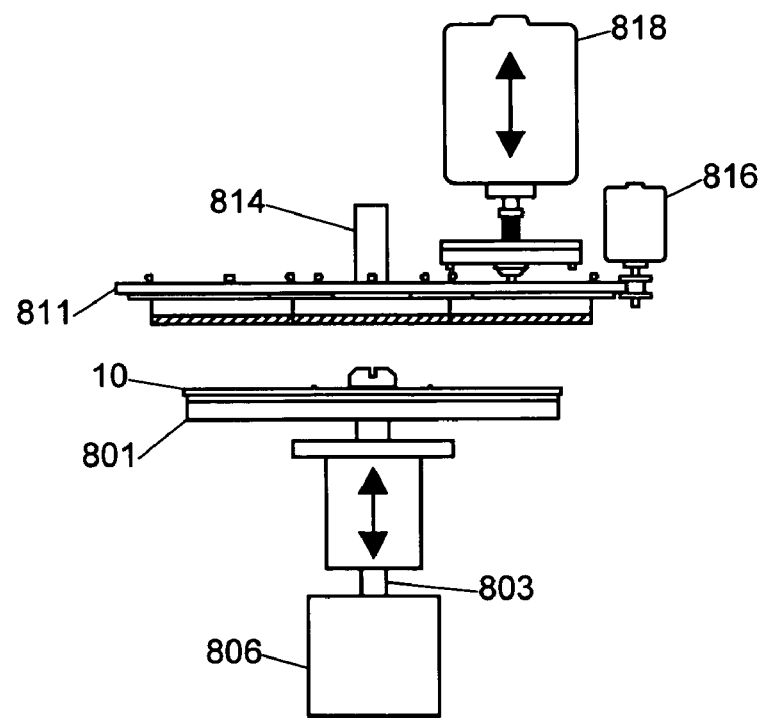

The center pin 804 is connected via a linking part 807 to the rotating controller 806 so that the rotation-controlling force (i.e. a braking or driving force) of the rotating controller 806 is transmitted via the linking part 807 to the center pin 804 and the turntable 801. The rotating controller 806 can be constructed using a braking mechanism, a motor or other devices. The rotating controller 806, which is located over the turntable 801 in the present embodiment, may be positioned under the turntable 801, as shown in FIG. 13(B). In this case, the rotation-controlling force of the rotating controller 806 is transmitted via the shaft 803 to the turntable 801.

Again in FIG. 8, it is necessary to break the linkage between the center pin 804 and the linking part 807 before setting the optical disk 10 on the turntable 801 if the center pin 804 is linked to the rotating controller 806 at the moment. For this purpose, at least either the disk rotating controller 80 or the polishing mechanism 81 is provided with an elevator (not shown) for breaking the aforementioned linkage by vertically moving the disk rotating controller 80 and/or the polishing mechanism 81 (as denoted by the arrows 80A and 81A in FIG. 8(B)). If the elevator is included in the polishing mechanism 81, the elevator can be also used as a polishing body-pressing mechanism (i.e. the polishing body elevator, to be detailed later) for pressing the polishing body 815 onto the optical disk 10. Alternatively, it is possible to break the aforementioned linkage by turning the disk rotating controller 81 and/or the polishing mechanism 81 around the point A (as shown by the arrow 80B in FIG. 8(C)).

The polishing mechanism 81 includes a turret 811 for holding polishing bodies, a turret driver 812 for rotating the turret 811, and a polishing body driver 813 for vertically moving and rotating a polishing body.

The turret 811, which is located over the turntable 801, is supported by a rotatable, tube-like shaft 814, whose diameter is about 2 to 3 cm. Held on the lower face of the turret 811 are four pieces of polishing bodies 815 differing in fineness and softness. The number of the polishing bodies 815 can be different from four. The structure for holding the polishing body 815 (i.e. the polishing body-holding unit) is to be detailed later. The aforementioned linking part 807 is inserted into the cavity of the shaft 814. The turret 811 and the turntable 801 are substantially concentric with and parallel to each other. If the linking part 807 is not used, or if the rotating controller 806 is located under the turntable 801 (as in FIG. 13(B)), there is no need to shape the shaft 814 like a tube. In this case, the substantially concentric and parallel arrangement of the turret 811 and the turntable 801 is required for achieving an adequate level of polishing efficiency and accuracy.

Figure 14:
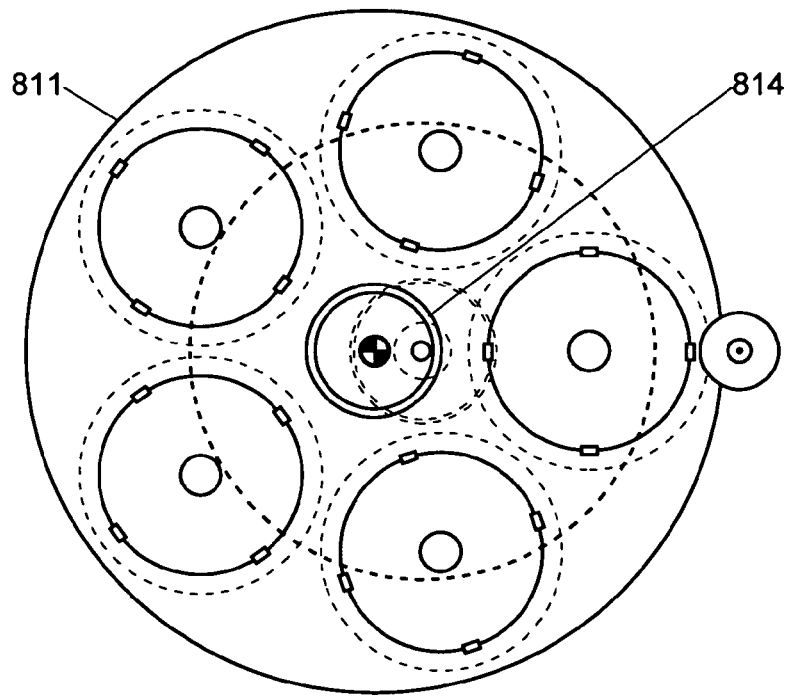
FIG. 14 is a plan view (A) and a side view (B) of another optical disk restoration apparatus according to the second embodiment.
Figure 14:
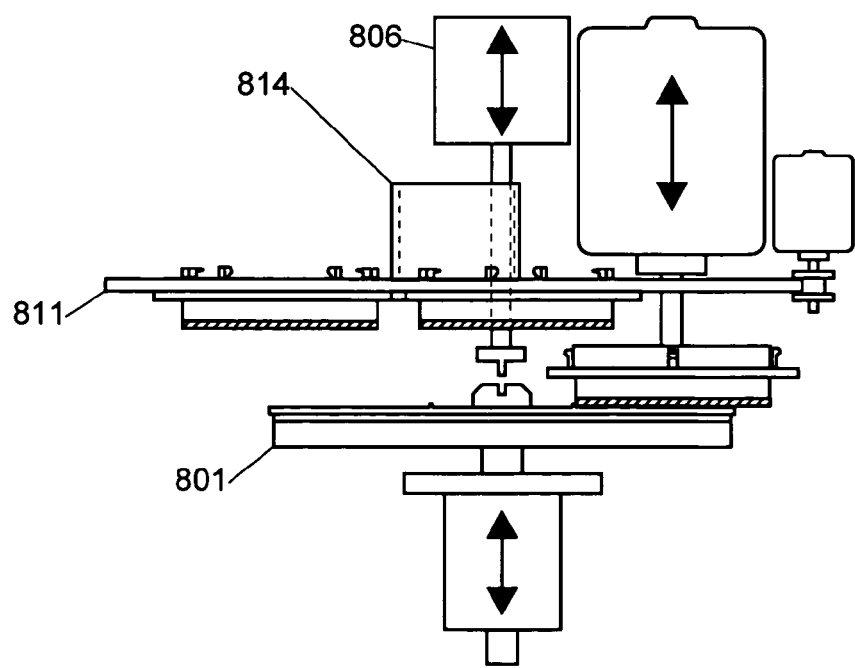
Figure 15:
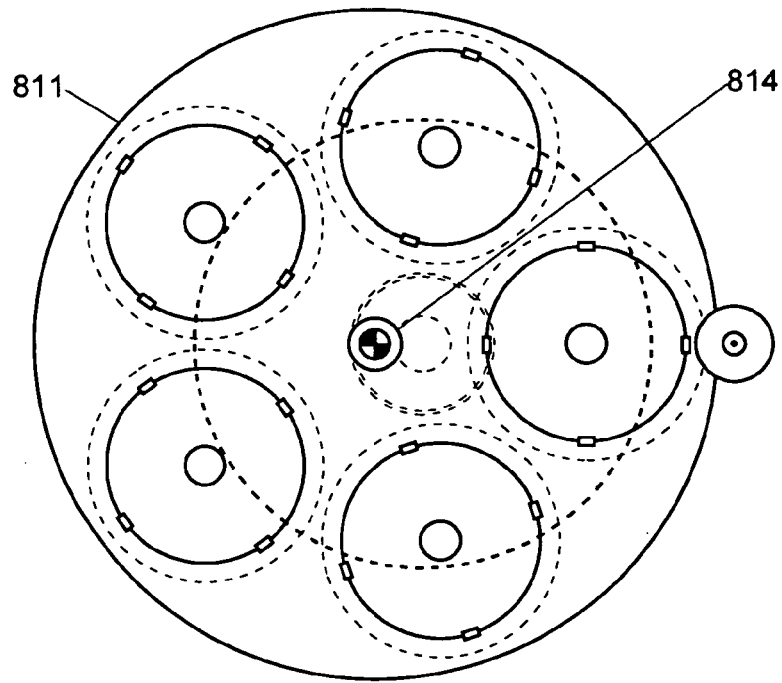
FIG. 15 is a plan view (A) and a side view (B) of a modified version of another optical disk restoration apparatus according to the second embodiment.
Figure 15:
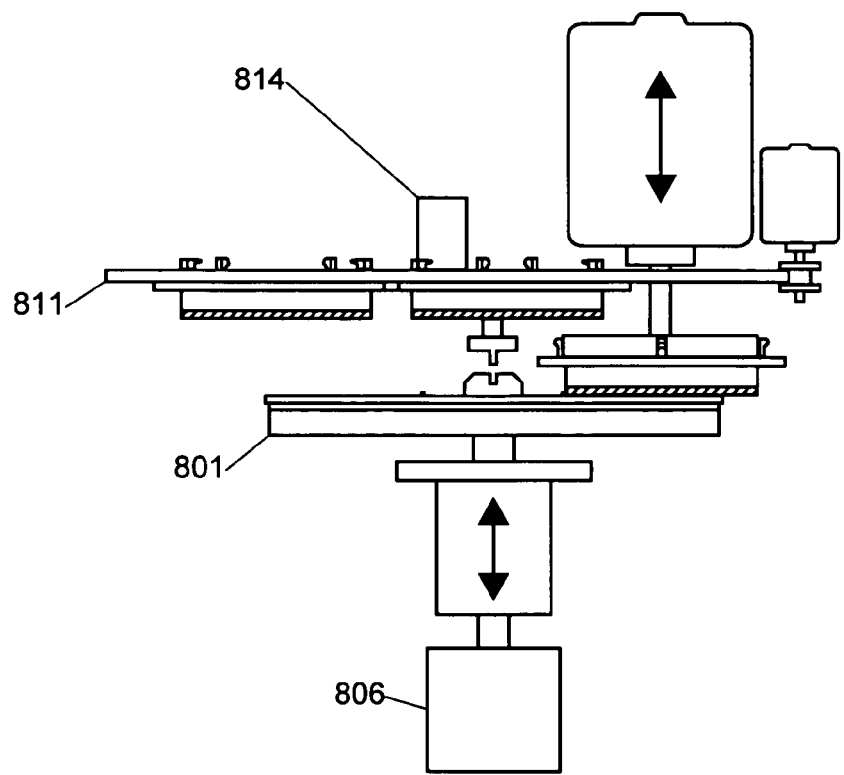

In the case of using five or more pieces of polishing bodies 815, the substantially concentric arrangement of the turret 811 and the turntable 801 may cause a problem in that the polishing action does not fully work on the area close to the center of the optical disk 10. Therefore, if the turntable 801 is located over the rotating controller 806, or if the linking part 807 is inserted into the cavity of the shaft 814, it is necessary to adequately increase the inner diameter of the tube-like shaft 814, as shown in FIG. 14. In contrast, if the rotating controller 806 is located under the turntable 801, there is no need to arrange the shaft 814 as shown in FIG. 14; it is only necessary that the two components 801 and 811 are not arranged in substantially concentric position (FIG. 15).

Again in FIG. 8, the turret driver 812 having a motor 816 and a pulley 817 is located next to the turret 811 so that the rotating force of the motor 816 is transmitted via the pulley 817 to the turret 811. It is also possible to use a gear instead of the pulley 817, or to use the pulley 817 and a belt or a sprocket and a chain.

The polishing body driver 813 includes a motor 818 for rotating the polishing body 815, a linking mechanism 819 for linking the motor 818 with the polishing body 815, and a polishing body elevator (not shown) for vertically moving the linking mechanism 819 or both the linking mechanism 819 and the motor 818.

Figure 9:
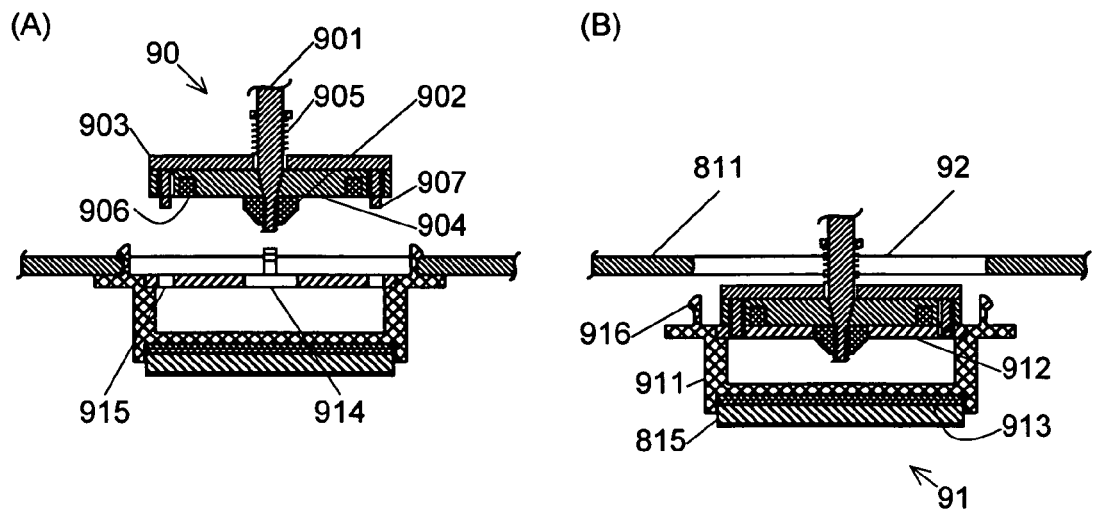
FIG. 9 shows the construction of the linking mechanism and the polishing body-holding unit in the first mode of the optical disk restoration apparatus of the second embodiment, where (A) is a sectional view showing them in the unlinked state and (B) is a sectional view showing them in the linked state.
Figure 10:
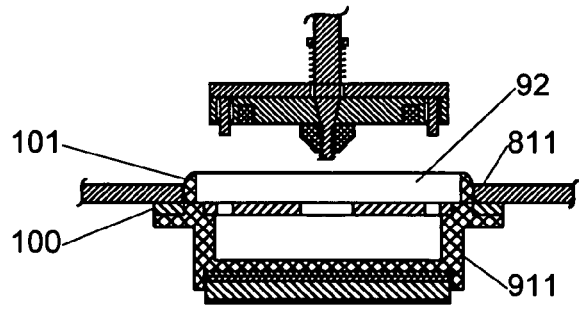
FIG. 10 is a sectional view showing the construction of the linking mechanism and the polishing body-holding unit in the second mode of the optical disk restoration apparatus of the second embodiment.
Figure 11:
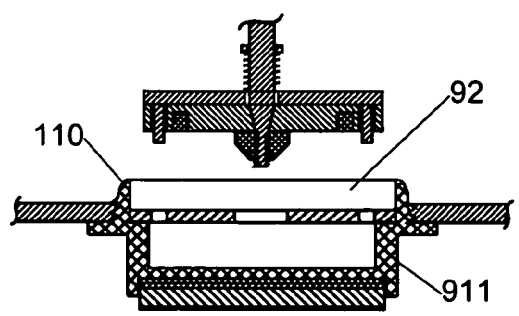
FIG. 11 is a sectional view showing the construction of the linking mechanism and the polishing body-holding unit in the third mode of the optical disk restoration apparatus of the second embodiment.
Figure 12:
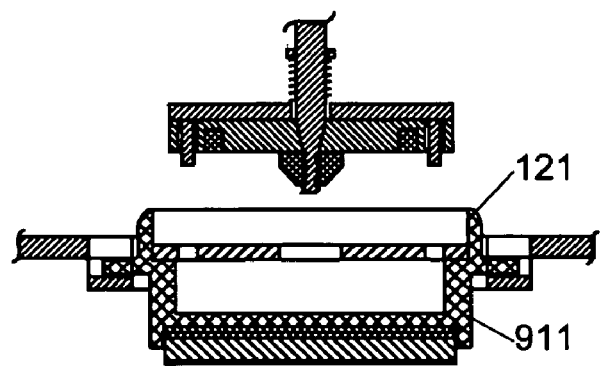
FIG. 12 is a sectional view showing the construction of the linking mechanism and the polishing body-holding unit in the fourth mode of the optical disk restoration apparatus of the second embodiment (A), and a perspective view of the polishing body-holding unit in the same mode (B).
Figure 12:
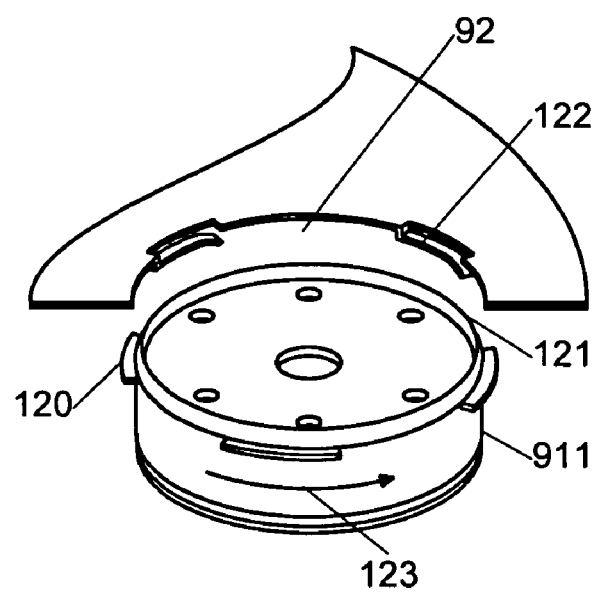

The construction and operation of the linking mechanism 819 and the polishing body-holding unit is hereby detailed with reference to FIGS. 9 to 12. FIG. 9 shows the first mode of the construction of the linking mechanism 819 and the polishing body-holding unit, where (A) is a sectional view showing them in the unlinked state and (B) is a sectional view showing them in the linked state. FIG. 10 is a sectional view showing the second mode of the linking mechanism 819 and the polishing body-holding unit in the unlinked state. FIG. 11 is a sectional view showing the third mode of the linking mechanism 819 and the polishing body-holding unit in the unlinked state. FIG. 12 is a sectional view showing the fourth mode of the linking mechanism 819 and the polishing body-holding unit in the unlinked state (A), and a perspective view showing the fourth mode of the polishing body-holding unit (B).

In FIG. 9(A), the linking mechanism 819 (denoted by numeral 90 in FIG. 9(A)) is located on the lower portion of the shaft 901 rotated by the motor 818. The shaft 901 has a thread on its lower end, on which a fixing nut 902 is screwed to fix a holding body 904 (to be detailed later) to the shaft 901. The linking mechanism 90 has a linking plate 903 and a holding body 904. The linking plate 903 is urged onto the holding body 904 by a coil spring 905. The holding body 904 has plural pieces of permanent magnets 906 embedded. It also has plural holes located in proximity to its circumference at predetermined intervals, and plural pins 907 located in proximity to the circumference of the linking plate 903 are inserted into the holes from above. The lower end of each pin 907 is sticking out from the lower face of the holding body 904 by a predetermined length (1 to 3 mm). Fitting the lower ends of the pins into the holes formed in the polishing body-holding unit 91 (to be detailed later) enables the rotating force of the motor 818 to be transmitted from the shaft 901 to the polishing body-holding unit 91.

The polishing body-holding unit 91 has a polishing body holder 911 and an attractive plate 912, and the polishing body 815 is attached to the lower face of the polishing body holder 911 via an attaching/detaching means 913. The polishing body 815 consists of, for example, a sponge-like cushioning material with a polishing sheet applied on its lower face. The attaching/detaching means 913 may employ a magnetic attaching/detaching means or a Hook-and-Loop fastener (e.g. VELCRO® or double-sided tape). An attractive plate 912 made of a magnetic material for pulling the holding body 904 is attached on the upper face of the polishing body holder 911. The attractive plate 912 is provided with a hole 914 located at its center, which is to be engaged with the fixing nut 902, and multiple holes 915 located at its circumference, which are to be engaged with the pins 907, respectively. The fixing nut 902 determines the position of the linking mechanism 90 and the polishing body-holding unit 91 so that their rotational centers coincide with each other.

In the means for pulling the holding body 904 onto the attractive plate 912, an electromagnetic magnet or similar element can be used instead of the permanent magnet 906. Furthermore, a vacuum-based suction force may be used instead of the magnetic force. Of course, it is also possible to perform the attaching/detaching operation of the holding body and the attractive plate by using a mechanical means.

The polishing body-holding unit 91 having the above-described construction is held on the lower face of the turret 811, or more specifically under the holding hole 92 formed in the turret 811, whose diameter is substantially the same as that of the polishing body holder 911. The polishing body holder 911 has plural claws 916 located on its circumferential edge, which are used as the means for holding the polishing body holder against the rotation of the polishing body-holding unit 91. In other words, the polishing body-holding unit 91 can be held by engaging the claws 916 with the circumference of the holding hole 92.

In addition to the claws 916 constructed and operated as described above, there are various types of holding means. For example, the one shown in FIG. 10 has plural pieces of permanent magnets 100 (e.g. rubber magnets) located on the circumferential edge of the polishing body holder 911 and a guide 101 standing on the same circumferential edge. The polishing body-holding unit 91 is held by the permanent magnets 100 magnetically attracted to the turret 811 made of a magnetic material and the guide 101 fitted into the holding hole 92. To magnetically hold the polishing body-holding unit 91, it is also possible to adopt the opposite construction in which the permanent magnets 100 are put on the lower face of the turret 811 (specifically, in proximity to the circumference of the holding hole 92) and the polishing body holder 911 is made of a magnetic material. Another possible construction has the permanent magnets 100 attached to the polishing body holder 911 (or the turret 811) and a ring (not shown) or similar part made of a magnetic material attached to the turret 811 (or the polishing body holder 911), with both the polishing body holder 411 and the turret 311 being made of non-magnetic materials.

In the example shown in FIG. 11, the polishing body holder 911 has a threaded guide 110 standing on its circumferential edge, and the holding hole 92 has a corresponding thread formed on its inner circumferential surface. When the motor 818 is activated to rotate the polishing body-holding unit 91, the polishing body-holding body 91 vertically moves along the inner circumferential surface of the holding body 92. In this operation, if the polishing body-holding unit 91 moves upwards, the polishing body-holding unit 91 is held on the lower face of the turret 911. Conversely, if it moves downwards, it is separated from the turret 811.

In the example shown in FIG. 12, the polishing body holder 911 has plural pieces of holding plates 120 located on its circumferential edge and a guide 121 standing on the same circumferential edge. The holding hole 92 has plural pieces of elastic holding springs 122 on its inner circumferential surface. With the guide 121 being fitted into the holding hole 92, if the polishing body-holding unit 91 is rotated in the direction indicated by the arrow 123, the holding plates 120 pushes open the spaces between the lower face of the turret 811 and the holding springs 122 and progress into the spaces until they reach the end of the holding plates 122 and are prevented from further rotation. Thus, the elastic force of the holding plates 122 locks the holding plates 120 in the spaces between the holding plates 122 and the lower face of the turret 811, thereby holding the polishing body-holding unit 91 in a secure position.

In addition to the linking mechanisms 90 and the polishing body-holding units 91 shown in FIGS. 9 to 12, there are various types of holding means. For example, mushroom-shaped pins standing on the circumferential edge of the polishing body holder 911, which are to be engaged with gourd-shaped holes formed in proximity to the circumference of the holding hole 92, can also securely hold the polishing body-holding unit 911.

In the following paragraphs, the operation for connecting the linking mechanism 90 and the polishing body-holding unit 91 is described with reference to FIG. 9. When the linking mechanism 90 driven by the polishing body elevator (not shown) moves downwards, the fixing nut 902 fits into the hole 914, whereby the polishing body-holding unit 91 and the linking mechanism 90 are fixed together, with their rotation centers coinciding with each other. A further descent of the linking mechanism 90 brings the pins 907 into the holes 915, and then the holding body 904 having the permanent magnets 906 embedded is magnetically attracted onto the attractive plate 912. Thus, the linking mechanism 90 is securely attached onto the polishing body-holding unit 91, thereby enabling the polishing body-holding unit 91 to receive the rotating force produced by the motor 818 and transmitted through the shaft 901 to the linking mechanism 90. A further descent of the linking mechanism 90 and the polishing body-holding unit 91 brings the claws 916 out of engagement, so that the polishing body-holding unit 91 is disconnected from the lower face of the turret 811 (FIG. 9(B)). The linking mechanism 90 and the polishing body-holding unit 91 further continue their descent until the polishing body 815 is pressed onto the optical disk 10 on the turntable 810 with a predetermined pressure (see FIG. 8(C)).

Depending on the positional relationship between the pins 907 and the holes 915, the descending operation of the linking mechanism 90 may fail to insert the pins 907 into the holes 915. If this occurs, the pins 907 collides with the attractive plate 912, and the reaction force resulting from the collision pushes the linking mechanism 90 upwards against the urging force of the coil spring 905. Therefore, the linking mechanism 90 is not securely fixed to the polishing body-holding unit 91. Then, the linking mechanism 90 and the polishing body-holding unit 91 connected in such an unstable state are further lowered. After the polishing body-holding unit 91 is separated from the lower face of the turret 811, the linking mechanism 90 (and the polishing body-holding unit 91) is activated into a slow rotation. The linking mechanism 90 and the polishing body-holding unit 91 are further lowered until the polishing body 815 is pressed onto the optical disk 10. Then, the lower ends of the pins 907 slide on the attractive plate 912 in the rotating direction. When the lower ends of the pins 907 thus sliding reach the holes 915, the coil spring 905 pushes the pins 907 down into the holes 915. As a result, the linking mechanism 90 is securely fixed to the polishing body-holding unit 91, as explained earlier. Accordingly, the unstable state of the connection lasts only a short period of time, which is dissolved immediately after the present apparatus starts its operation.

Next, the operation for disconnecting the linking mechanism 90 from the polishing body-holding unit 91 is described with reference to FIG. 9. After the polishing process is finished, the polishing body elevator lifts up the linking mechanism 90 and the polishing body-holding unit 91 to engage the claws 916 with the circumference of the holding hole 92. Thus, the polishing body-holding unit 91 is held again on the lower face of the turret 811. Meanwhile, the motor 818, which has been rotating throughout the polishing process, is stopped after the polishing body 815 is detached from the optical disk 10 during the upward motion of the linking mechanism 90 and the polishing body-holding unit 91. The lifting operation of the linking mechanism 90 is further continued to detach the holding body 404 from the attractive plate 412, then pull out the pins 907 from the holes 915, and finally disengage the fixing nut 902 from the hole 914, allowing only the linking mechanism 40 to continue its ascent. The linking mechanism 90 is further lifted up to its original position, whereas the polishing body-holding unit 91 remains held on the lower face of the turret 811.

To take a detaching operation into consideration, the attractive force for pulling the polishing body 904 onto the attractive 912 needs to be larger than the reaction force that acts on the claws 916 when they are pushed into the hole 92. However, too large an attractive force might damage the linking mechanism 90 and the polishing body-holding unit 91 by an excessive load that could take place during the detaching operation against the attractive force. Therefore, it is necessary to moderately regulate the attractive force so as to prevent an excessive load from working on the components concerned.

The foregoing description about the construction and operation of the linking mechanism 90 and the polishing body-holding unit 91 assumed that the polishing body elevator vertically moves only the linking mechanism 90 (and the polishing body-holding unit 91). However, the construction can be modified so that the motor 818 is also vertically moved together with the linking mechanism 90 (and the polishing body-holding mechanism 91).

Next, the sequence of the operation of the optical disk restoration apparatus of the present embodiment having the above-described construction is described with reference to FIGS. 8 and 9.

First, the operator mounts an optical disk 10 on the turntable 801. Of course, it is possible to construct the apparatus so that the optical disk 10 is automatically set on the turntable 801 in response to a key operation performed by the operator. At this moment, if the linking part 807 is already engaged with the center pin 804, the disk rotating controller 80 and/or the polishing mechanism 81 should be operated to make a preliminary vertical/rotary motion to disengage the linking part 807.

After the optical disk 10 is set, the turret driver 812 is activated to rotate the turret 811 so that the polishing body driver 813 is connected to a polishing body-holding unit 91 having a suitable polishing body 815 selected according to the depth of the scratches on the optical disk 10.

After the turret 811 is rotated to the specified position, the polishing body elevator is activated to lower the linking mechanism 819/90 to connect the linking mechanism 819/90 to the specified polishing body-holding unit 91 by the connecting operation described previously. The linking mechanism 819/90 and the polishing body-holding unit 91 thus connected are further lowered so that the polishing body-holding unit 91 is detached from the lower face of the turret 811 and then the polishing body 815 held by the polishing body-holding unit 91 is pressed onto the optical disk 10. In this operation, after the polishing body-holding unit 91 is detached from the lower face of the turret 811, the motor 818 is activated to slowly rotate the linking mechanism 819/90 and the polishing body-holding unit 91 before the polishing body 815 is pressed onto the optical disk 10.

Meanwhile, the rotating controller 806 is also activated to rotate the turntable 801 and the optical disk 10. Alternatively, it is possible to make the optical disk 10 passively rotate due to the reaction force resulting from the rotation of the polishing body 815. In this case, the rotating controller 806 regulates the rotation of the optical disk 10 so that a speed difference or speed ratio appropriate for the polishing process takes place between the two 10 and 815. This causes friction between the optical disk 10 and the polishing body 815, whereby the surface of the optical disk 10 is polished by the polishing body 815.

After the polishing operation is finished, the polishing body elevator is activated to lift up the linking mechanism 819/90 and the polishing body-holding unit 91, and the rotation of the motor 818 and the rotating controller 806 is stopped. Then, the linking mechanism 819/90 and the polishing body-holding unit 91 further moves upwards to disconnect the linking mechanism 819/90 from the polishing body-holding unit 91 by the detaching operation described previously. The polishing body-holding unit 91 thus disconnected is held on the lower face of the turret 811, whereas the linking mechanism 819/90 is further lifted up to its original position.

Subsequently, the turret 811 is rotated again to the predetermined position so as to connect the polishing body driver 813 to a new polishing body-holding unit 91 having another polishing body 815 suitable for the next stage of the restoration process. After this operation, the above-described sequential operations are performed again.

The invention claimed is:

1. An optical disk restoration apparatus comprising:
   a) a rotatable object holder for holding an object to be polished;
   b) a turret for holding multiple polishing bodies during polishing operations;
   c) a turret driver for rotating the turret between polishing operations to interchange between polishing bodies being positioned opposite the object to be polished;
   d) a linking mechanism for holding one of the polishing bodies while allowing the polishing body to rotate;
   e) a pressing/separating means for pressing or separating the object to be polished and the polishing body held by the linking mechanism onto or from each other;
   f) a driver for rotating the linking mechanism;
   g) a rotating controller for regulating the rotation of the rotatable object to be polished; and
   h) a linking part connecting the rotation controller and the object holder inserted through a cavity of a shaft of the turret, wherein
   the driver is a single driver including means for selectively coupling to each of the multiple polishing bodies when the turret positions each of the multiple polishing bodies opposite the object to be polished.

2. The optical disk restoration apparatus according to claim 1, wherein the shaft of the turret has a cavity whose diameter is adequately large.

3. The optical disk restoration apparatus according to claim 1, wherein the rotating controller is located at the lower end of a shaft of the object holder.

4. The optical disk restoration apparatus according to claim 1, wherein the object holder and the turret are arranged so that they are substantially concentric with and parallel to each other.

5. The optical disk restoration apparatus according to claim 2, wherein the object holder and the turret are arranged so that they are substantially parallel to each other but are not substantially concentric with each other.

6. The optical disk restoration apparatus according to claim 1, wherein the object holder and the turret can be disengaged from each other by a vertical motion or a rotation of the object holder and/or the turret.

7. The optical disk restoration apparatus according to claim 1, wherein the turret holds the linking mechanism by holding claws.

8. The optical disk restoration apparatus according to claim 1, wherein the turret holds the linking mechanism by a magnetic force.

9. The optical disk restoration apparatus according to claim 1, wherein the turret holds the linking mechanism by a thread engagement.

10. The optical disk restoration apparatus according to claim 1, wherein the turret holds the linking mechanism by an elastic force of a spring.

* * * * *